Feb. 16, 1965    J. KELAR ETAL    3,170,150
MENSURATION DEVICE WITH ELECTRONIC
DETECTION FOR REMOTE READING
Filed July 11, 1960    4 Sheets-Sheet 1
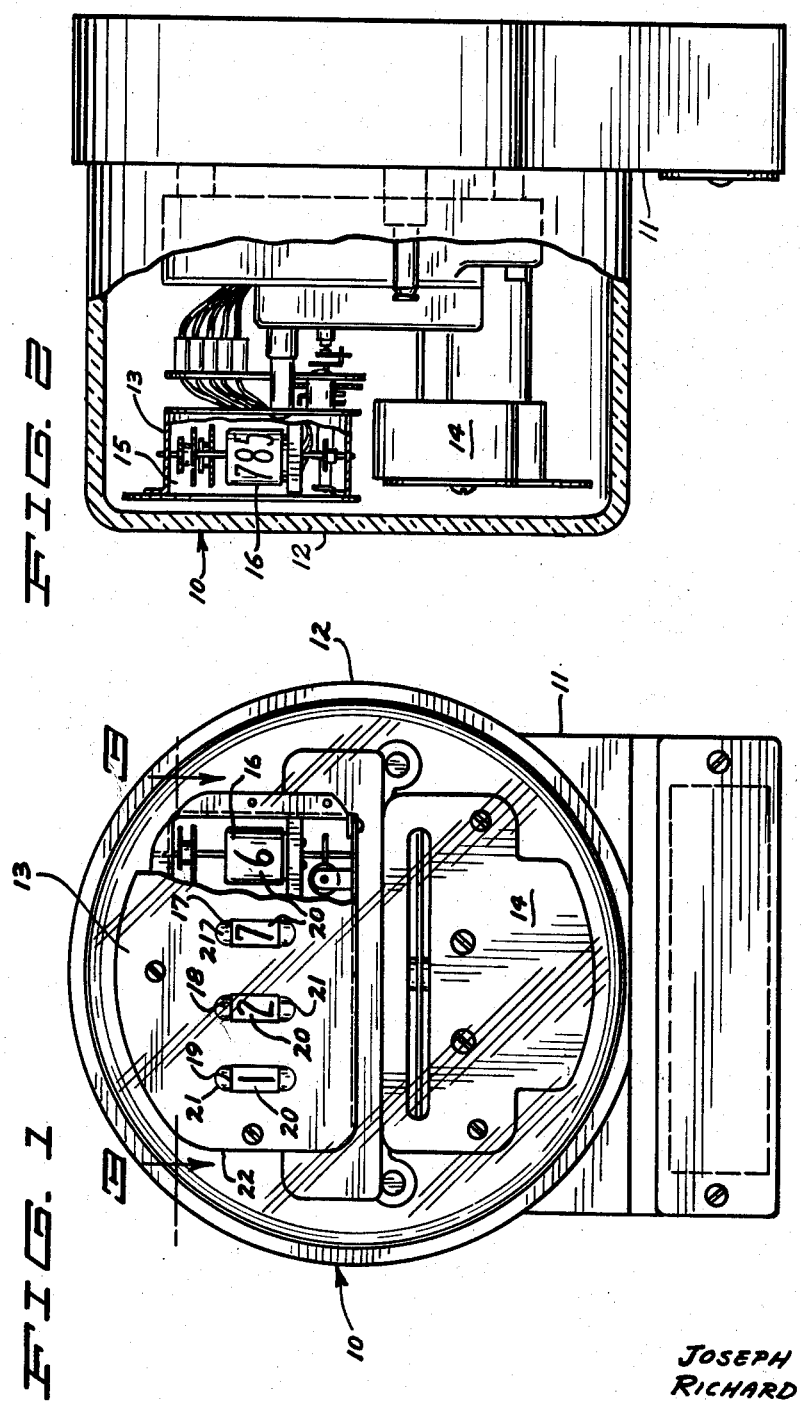
INVENTOR.
JOSEPH KELAR
RICHARD L. DENNISON
NORMAN E. DAGGETT
BY ...........
ATTORNEY

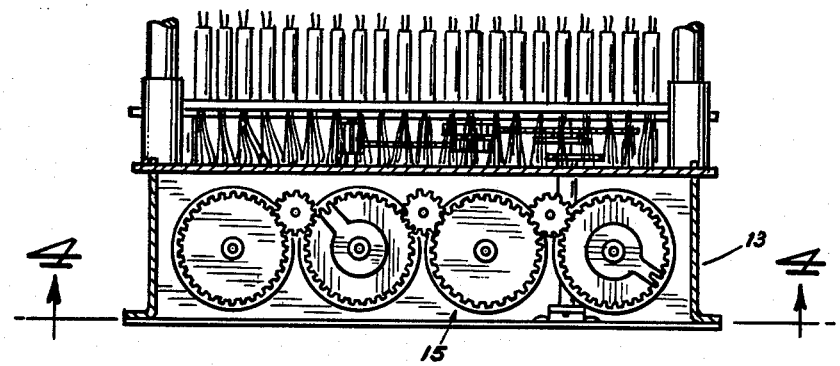
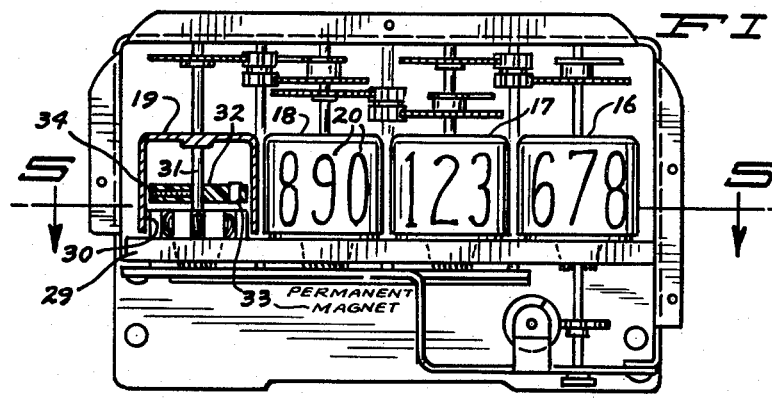
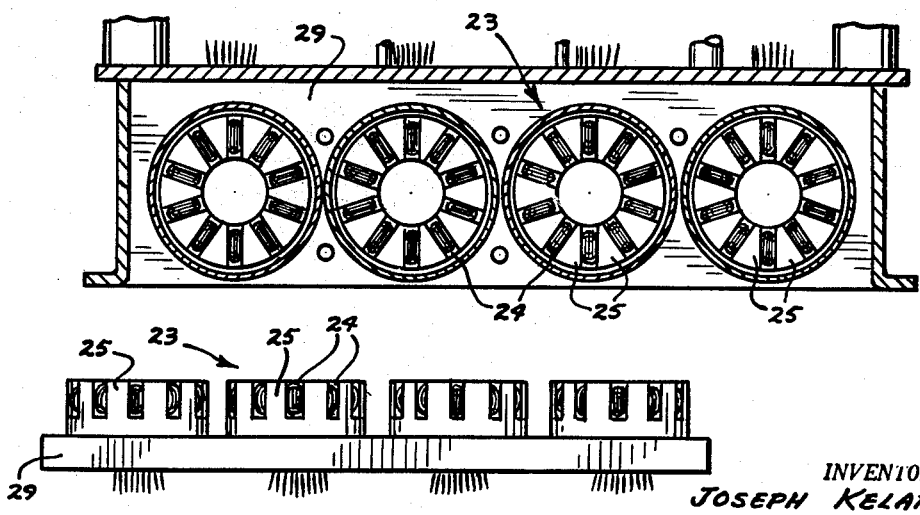

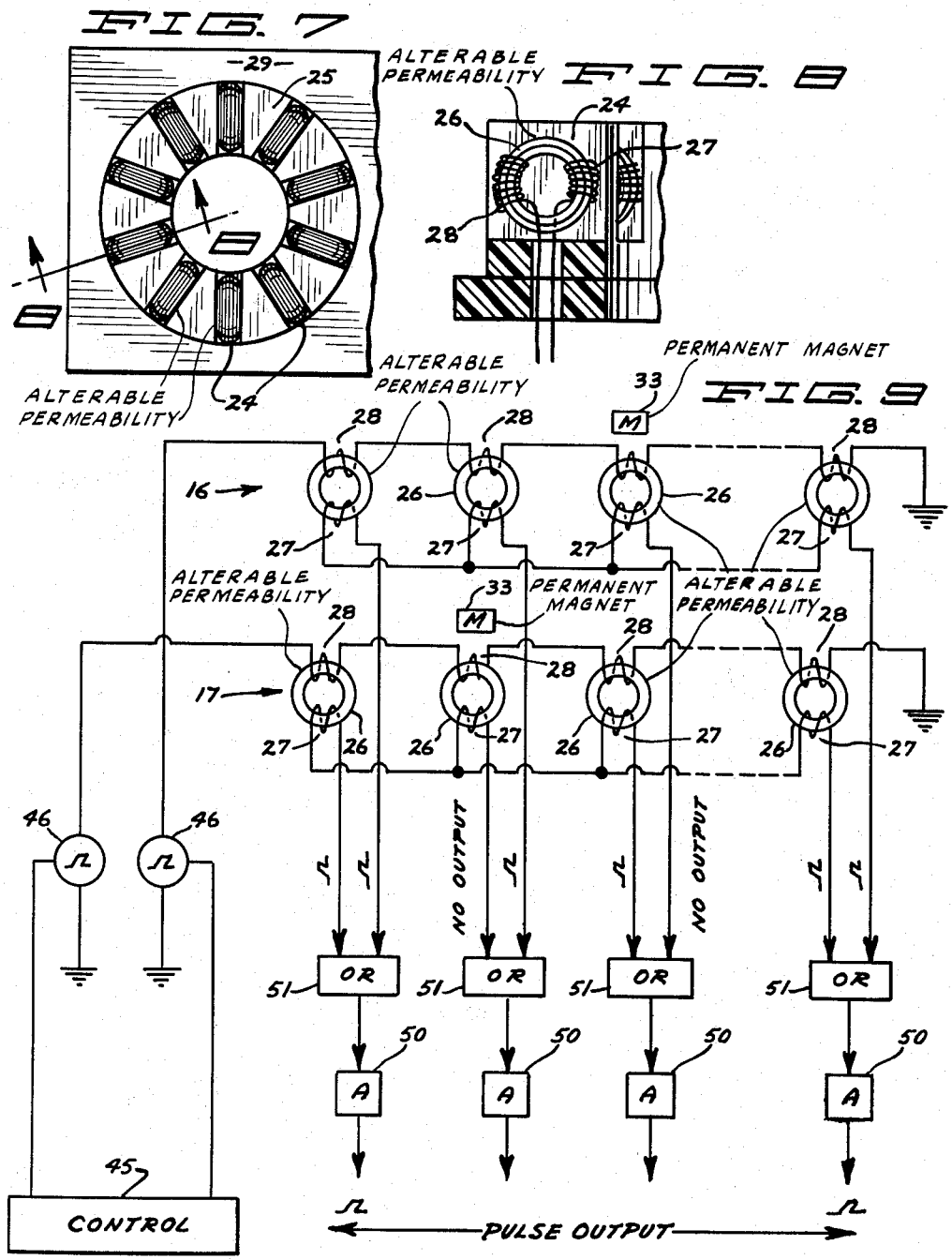

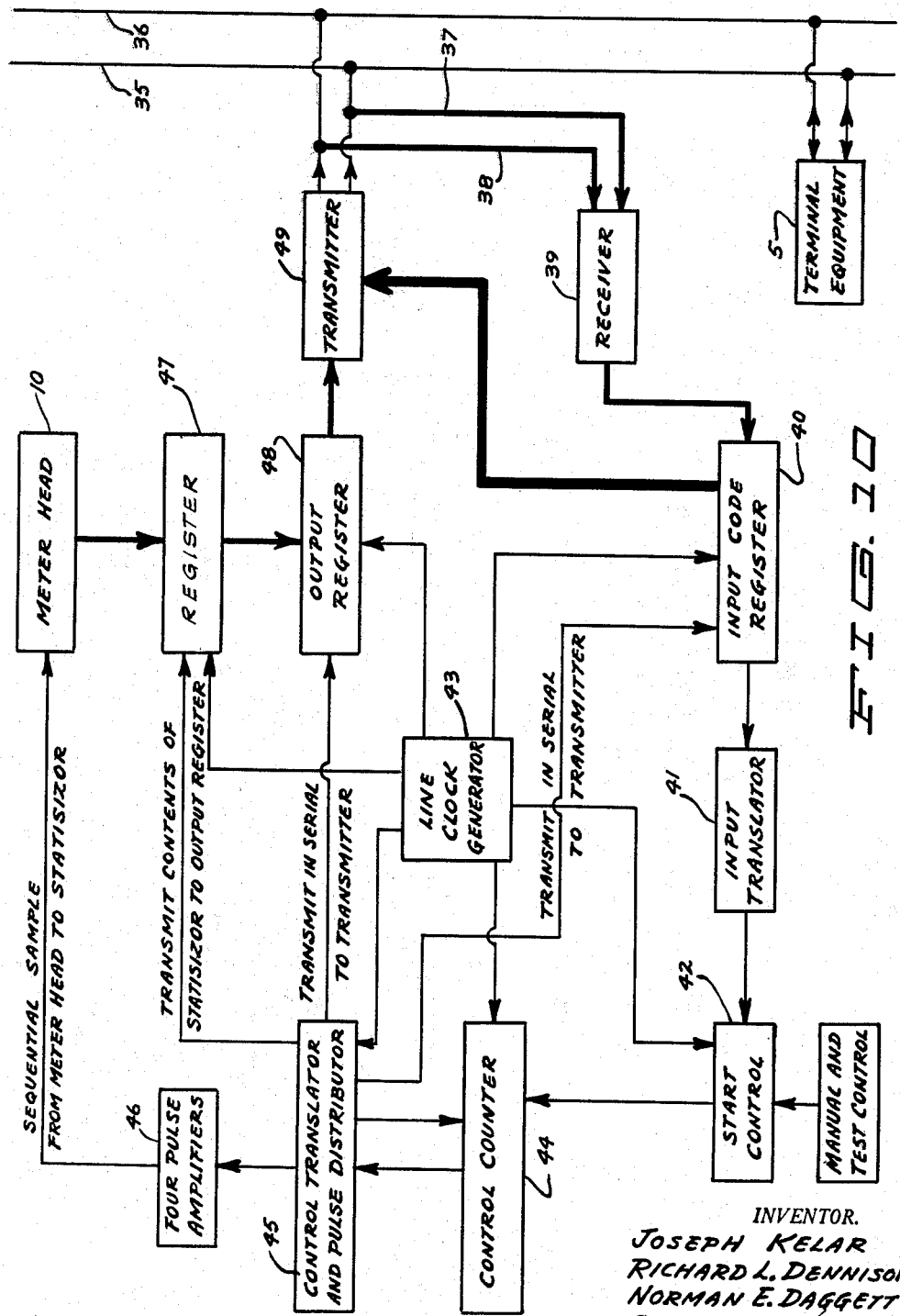

United States Patent Office 3,170,150
Patented Feb. 16, 1965

3,170,150
MENSURATION DEVICE WITH ELECTRONIC
DETECTION FOR REMOTE READING
Joseph Kelar, Richard L. Dennison, and Norman E. Daggett, Minneapolis, Minn., assignors to Magnetic Controls Co., Minneapolis, Minn., a corporation of Minnesota
Filed July 11, 1960, Ser. No. 41,861
5 Claims. (Cl. 340—197)

This invention relates to telemetering and more particularly to a mensuration unit so constructed as to be capable of being read at will from a remote location.

It is an object of the invention to provide a mensuration unit with a detecting mechanism which will be electro-mechanical in character, yet will avoid physical contact switching with its attendant lack of resistance to wear and general unreliability.

Another object of the invention is to provide self-reading meters constructed so as to be supplied with simple small auxiliary elements making each meter readable in a positive digital system responding to the position of the meter digital indicators at the time the reading is taken.

A further object of the invention is to provide a meter or other measuring device of the class described wherein transformer elements, each corresponding to a digit in each decimal position, detect the presence, substantial absence or modification of an induced pulse therein depending upon the rotational position of the decimal drum or dial and the detection thereof may be encoded, transmitted and read at a central station or location.

A still further object of the invention is to provide a meter unit with electric circuitry capable of responding to a command, containing in proper form an identification code of that unit, transmitting the identification code and then reading the meter into a communication link for reception and interpretation by terminal equipment.

These and other objects and advantages of the invention more fully will appear from the following description, made in connection with the accompanying drawings, wherein like reference characters refer to the same parts throughout the several views and in which:

FIGURE 1 is a front view of a kilowatt hour meter embodying our invention, portions thereof being cut away to show the internal structure thereof.

FIGURE 2 is a side view of the meter, portions being vertically sectioned to show internal parts.

FIGURE 3 is a top view of the meter register including the drum mechanism.

FIGURE 4 is a vertical sectional view of the meter register taken on the line 4—4 of FIGURE 3, one of the drums being cut away in vertical section to show the internal parts.

FIGURE 5 is an enlarged horizontal section taken on the line 5—5 of FIGURE 4 and showing the coil array associated with each of the drums.

FIGURE 6 is an enlarged side view of the coil arrays apart from the remaining meter mechanism.

FIGURE 7 is a further enlarged segmental view of one of the coil arrays.

FIGURE 8 is a side view of a single coil taken in fragmentary section on the line 8—8 of FIGURE 7.

FIGURE 9 is a combined wiring and block diagram showing the manner in which the cores are interconnected and pulsed.

FIGURE 10 is a block diagram indicating the functional circuit units and their interrelationship for transmitting and receiving encoded signals within a typical system.

Referring now to FIGURES 1 and 2, a meter is indicated by the numeral 10. The meter shown is a conventional kilowatt hour meter although it is understood that other types of meters or measuring devices may be adapted to the present invention, which devices include voltmeters, ammeters, fluid and gas meters, alarm devices, and any other mensuration device having physically moving indicating or registering parts.

While the invention can be adapted to different types of indicator reading instruments using a radix such as binary, octal or other numeric system, the particular adaption here shown utilizes a drum type of dial, reading directly in the decimal system and indicating electric power consumption in kilowatt hours.

The meter 10 comprises a housing 11 having a transparent dome 12 through which a meter register 13 is plainly visible. Ordinary electro-mechanical means 14 for turning the counting linkage 15 in the meter register 13 is employed. In the meter register 13, the gear train 15 is operated in conventional manner so as to rotate the drums 16, 17, 18 and 19 in increasing order of magnitude such that drum 16 will register from zero to 9 in the unit position, drum 17 will turn similarly to read in units in the tens position, the drum 18 in the hundreds position and drum 19 similarly registering units in the thousands position. The gear train and means for rotating the drums are well known in the art and will not be described in detail in this specification. It is to be noted, however, that each of the drums 16 through 19 are provided with numerical indicia 20, one number of which is visible at each decade location at corresponding opening 21 through front shield 22 of meter register 13, an opening 21 being appropriately in registry with each of the drums 16 through 19.

Our invention comprehends the utilization of a conventional meter 10 through the addition of an array of transformer cores of alterable permeability whose magnetic state may be changed by a permeability altering element such as a magnet and then sensed to interpret the reading on the drum or dial of the meter unit. The core arrays are electronically scanned in a predetermined manner to obtain the meter register reading. Circuits to perform shaping, timing, gating, checking and so forth are utilized to generate suitable signal formats for translation of the signals.

Because the electronic members which we utilize for reading purposes can be miniaturized, it is possible to insert them into spaces normally occurring in conventional meters.

Referring to FIGURE 6, core arrays indicated generally as 23 may be constructed by embedding transformer elements 24 in spaced radial fashion within plastic dielectric ring 25 so that each transformer 24 represents a digit from zero to 9. The transformers are equally spaced and correspond in position to the numerical indicia 20 as it appears upon the drums or dials 16. In the present embodiment of the invention, there is a circularly embedded set of transformers 24 for each decade in the meter register making a sum total of 40 transformers in the coil arrays. Each transformer consists of a circular core 26 which may be constructed of suitable magnetic core material and the core is wound with a primary winding 28 and a secondary winding 27 as shown in FIGURES 8 and 9. The coil arrays, embedded in the decade system of annular plastic hubs or rings 25 as shown in FIGURE 6, may be mounted upon or formed integrally with a bar 29 which suitably positions them with respect to the lower open ends 30 of corresponding drums 16 through 19 as shown in FIGURE 4. When thus positioned, each drum shaft 31 lies axially of an annular ring 25 as shown.

Mounted on each of the drum shafts 31 is a non-magnetic disc 32 in which is secured a permanent magnet 33, the magnet 33 being radially spaced from the shaft 31 so as to overlie the transformers 24 and to pass in close proximity, but not in physical contact therewith, when the associated drum is rotated. It should be noted that the disc 32 is secured to shaft 31 by such means as set screw 34 so that the drum and the permanent magnet 33 will maintain their relative position and will rotate together.

It is understood that the meter unit is of, or can be, made to assume, a digital character as in the case of the exemplified kilowatt hour meter 10, which is conventionally designed so that discrete arcuate movements are made by each of the dials or drums 16 through 19. Thus in the embodiment shown, there is always positively positioned a magnet 33 directly over one transformer element 24 and not at any intermediate position which would influence more than one transformer in the same coil array. No matter what the setting of the dials or drums 16 through 19 assume, there will be one transformer element in association with a coil array in each of the drums which has an external magnetic field imposed upon it by a magnet 33. In the case of other types of meters previously mentioned, which include voltmeters, ammeters and the like, various mechanical and electrical expedients of well known character may be employed to similarly achieve successive and exclusive readings from an individual coil in each coil array.

Referring now to FIGURE 10, when the terminal equipment 5 transmits a meter code onto the line 35–36, it is received by each meter head 10 connected to that line. The code is brought in by leads 37 and 38, bit-by-bit through the receiver 39 where the various gating functions are performed and then loaded into the input code register 40. In the input code register 40, the basic fault checks are made. Should a fault occur, the code is not acted upon. The input code register 40 also provides a counter function which notifies the input translator 41 when it is to "look" at the contents of the input code register 40. This occurs after the reception of a preselected number of bits of information. The input translator 41 inspects the received code to see if it is the code assigned to the meter head 10. If it is not, all registers are cleared out and the system returns to a quiescent condition. If it is the proper code, a start is initiated. When the start control 42 is actuated, it allows clock pulses from line clock generator 43 to go into the control counter 44. The control counter 44 is the real time clock for the meter unit and controls the timing of all subsequent operations. The condition of the counter is sensed by the control translator 45 with all direct current and pulse signals emanating from the translator. Pulse signals pass through four pulse amplifiers 46 which are then fed to the meter head 10.

The terminal equipment 5 is the interrogating device that signals the meter head 10 for a reading by transmitting a meter code onto the line. The meter code which was received through receiver 39 is transmitted back to the terminal equipment 5 for indentification as previously mentioned. The first core array associated with meter drum or dial 16 is then probed and the contents of the probe dumped into the register 47. On the next clock pulse, the contents of the register 47 are transferred to the output register 48 and converted to binary coded decimal in the process. The contents of the output register 48 is transferred, bit-by-bit to the transmitter 49 where it is transmitted onto the line 35–36.

The second core array which is associated with the meter drum or dial 17 is then probed with the contents of the probe dumped into register 47 in the same manner as the first core array. In a similar manner, the third core array and fourth core array are treated in sequence until the intelligence has been completely transferred from the meter head 10 to the transmitter 49.

Upon completion of probing of the meter head 10, a stop signal is issued by the control translator 45 and the meter unit 10 returns to a quiescent condition.

Referring now to FIGURE 9. Representations of core arrays for drum 16 and drum 17 respectively, and the probing and sensing thereof are shown in diagrammatic and abbreviated form. A pulse is gated into core pulse amplifier 46 by the control translator and pulse distributor 45. This pulse is driven into the primaries 28 of cores 26 which are connected in series for each core array. From the primary pulsing, a parallel readout of the cores is performed for all those cores 26 in each array that are not covered by a permanent magnet 33, a pulse is transformed into the secondary winding 27 and is detected by an amplifier 50. The core 26 that is covered by the permanent magnet drastically modifies the pulse and hence, the amplifier connected to it does not detect a pulse. Thus, in FIGURE 9, in the core array for drum 16, the core 26, having over it the permanent magnet 33, yields no pulse from its secondary winding 27 to the associated amplifier 50. Similarly, for the core array associated with drum 17, the core 26 having the permanent magnet 33 in association therewith will also transmit no pulse or a modified pulse to its associated amplifier 50.

The above mentioned amplifiers 50 are each connected to one stage of the register 47. Those amplifiers 50 that detect a pulse will affect the corresponding stage of the register 47. The one amplifier that does not detect a pulse will not affect its corresponding stage of the register. All four core arrays use the same ten amplifiers 50 through "or" mixing circuits 51 as diagrammatically shown in FIGURE 9. The entire identification and probing of the meter heads 10 are accomplished without mechanical switching and by a rapid procedure which makes it possible for large numbers of meter heads to be accurately probed and read at a central location.

It will, of course, be understood that various changes may be made in the form, details, arrangement and proportions of the parts without departing from the scope of our invention.

What we claim is:

1. In mensuration apparatus of the digital type, indicator means rotatable to register values of mensuration, a plurality of separate and distinct transformer units each having a core of alterable permeability and disposed at spaced intervals and defining a circular pathway coaxial with said indicator means, each of said transformer units corresponding to a predetermined value of mensuration on said indicator means, a permanent magnet lying closely adjacent said pathway and having a surface adapted to overlie any one of said transformers and only one at a time, means mechanically coupled to said indicator means for causing relative rotation between said plurality of transformer units and said permanent magnet along said prescribed circular pathway, means supplying electrical input pulses to the primaries of said transformers, and means detecting the difference in character between the output pulse of the transformer over which the permanent magnet lies and that of the remaining transformers whereby to read the value of mensuration corresponding thereto.

2. In mensuration apparatus of the digital type, indicator means having indicia at spaced intervals thereon and being physically shiftable in increments corresponding to said spaced intervals to register values of mensuration, a plurality of separate and distinct transformer units each having a core of alterable permeability and disposed at spaced intervals and defining a prescribed pathway, a permanent magnet lying closely adjacent said pathway and having a surface adapted to overlie any one of said transformers and only one at a time, said magnet being mounted upon said indicator means and shiftable therewith for an increment so that the magnet surface will overlie another transformer adjoining said one transformer, means supplying electrical input pulses to the primaries of said transformers, and means detecting the difference in character between the output pulse of the transformer over which the permanent magnet lies and that of the remaining transformers.

3. In mensuration apparatus of the digital type, indicator means physically rotatable to register values of mensuration, a plurality of separate and distinct transformers each having a core of alterable permeability and disposed at spaced intervals in a ring around the axis of said indicator means, each of said transformers corresponding to a prescribed value of mensuration, a permanent magnet mounted on said indicator means and having a surface adapted to closely overlie one of the transformers and only one at a time, means supplying electrical input pulses to the primaries of said transformers, and means detecting the difference in character between the output pulse of the transformer over which the permanent magnet lies and that of the remaining transformers whereby to read the value of mensuration corresponding thereto.

4. In mensuration apparatus of the digital type, indicator means having a plurality of drums each representing a numerical decade, a plurality of transformer units each having a core of alterable permeability fixedly mounted circularly within each of said drums and lying in arcuately spaced relation, a permanent magnet affixed to each of said drums closely adjacent the circularly disposed transformers and adapted to overlie any one thereof, means supplying electrical input pulses to the primaries of said transformers, and means detecting the difference in character between the output pulse of the transformer over which the permanent magnet lies and that of the remaining transformers.

5. A remote-reading meter device of the digital type comprising a plurality of rotary decimal indicators, one each for a decade position, a permanent magnet mounted radially outward from the axis and at a fixed position on each of said rotary decimal indicators, a plurality of transformer arrays, each array having a plurality of transformers circularly disposed about the axis of each of said decimal indicators and radially outward from the axis thereof in ecah instance, each transformer having a magnetic core of alterable permeability, one core of each array being the only core within the magnet flux of the said magnet for that particular array, means pulsing sequentially each array, and means remote from said meter device for sensing the position of each of said permanent magnets with respect to its associated decimal indicator whereby to effect a reading of the meter device.

References Cited by the Examiner
UNITED STATES PATENTS

| | | | |
|---|---|---|---|
| 2,067,098 | 1/37 | Rogers | 340—203 |
| 2,447,496 | 8/48 | Depp | 340—197 |
| 2,740,110 | 3/56 | Trimble | 340—197 |
| 2,948,842 | 8/60 | Ditto | 340—197 |

FOREIGN PATENTS 894,947  1/45  France.

NEIL C. READ, *Primary Examiner.*

THOMAS B. HABECKER, L. MILLER ANDRUS,
*Examiners.*